United States Patent
Mohajer et al.

(10) Patent No.: US 11,461,812 B2
(45) Date of Patent: *Oct. 4, 2022

(54) CONCEPT-BASED AUGMENTATION OF QUERIES FOR APPLYING A BUYER-DEFINED FUNCTION

(71) Applicant: SoundHound, Inc., Santa Clara, CA (US)

(72) Inventors: Keyvan Mohajer, Los Gatos, CA (US); Scott Halstvedt, Santa Clara, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,179

(22) Filed: Sep. 16, 2019

(65) Prior Publication Data

US 2020/0013094 A1    Jan. 9, 2020

Related U.S. Application Data

(63) Continuation of application No. 15/293,931, filed on Oct. 14, 2016, now Pat. No. 10,453,101.

(51) Int. Cl.
*G06Q 30/00* (2012.01)
*G06Q 30/02* (2012.01)
(Continued)

(52) U.S. Cl.
CPC ....... *G06Q 30/0275* (2013.01); *G06F 40/289* (2020.01); *G06F 40/30* (2020.01)

(58) Field of Classification Search
CPC ............ G06Q 30/0275; G06Q 30/0283; G06F 40/289; G06F 40/30; G06F 8/20
See application file for complete search history.

(56) References Cited

U.S. PATENT DOCUMENTS 9,361,365 B2 * 6/2016 Sweeney ............... G06F 16/367
10,817,787 B1 * 10/2020 Zhang .................. G06F 40/295
(Continued)

FOREIGN PATENT DOCUMENTS

CN      102947823 A      2/2013
JP      4451435 B2 *     4/2010   ......... G06F 17/2785

OTHER PUBLICATIONS

"A Semantic Approach to Discovering Schema Mapping Expressions". IEEE. 2007. (Year: 2007).*

*Primary Examiner* — Maria V Vanderhorst
(74) *Attorney, Agent, or Firm* — David R. Stevens; Stevens Law Group

(57) ABSTRACT

Original concepts obtained from a query may be augmented with additional concepts connected to the original concepts in a concept graph in response to determining that the original concepts did not match a sufficient number of bid functions. The augmented set of concepts may then be evaluated with respect to the bid functions to identify matching ad functions. This process may be repeated until a sufficient number of matching ad functions are found. A bid amount of the matching bid functions may be calculated, such as based on semantic information obtained as a result of the query. The bid amounts may further be based on environmental information. A bid function is selected based on the bid amounts and the content associated with the bid function is provided to the source of the query. The content may be selected based on the semantic information.

22 Claims, 8 Drawing Sheets

(51) Int. Cl.
*G06F 40/289* (2020.01)
*G05B 19/418* (2006.01)
*G06F 40/30* (2020.01)

(56) References Cited

U.S. PATENT DOCUMENTS

| | | |
|---|---|---|
| 2005/0165766 A1 | 7/2005 | Szabo |
| 2008/0052219 A1 | 2/2008 | Sandholm et al. |
| 2008/0140389 A1* | 6/2008 | Funakoshi .............. G06F 40/30 |
| | | 704/9 |
| 2011/0184816 A1* | 7/2011 | Jones ................. G06Q 30/0275 |
| | | 705/14.71 |

* cited by examiner

CONCEPTS n0: "car" "cars" "auto" "ride"
n1: "antifreeze"
n2: "brakes"
n3: "hole"
n4: "radiator"
n5: "parts"

v0: "leak"
v1: "repair" "fix"

m0: "broken" "busted"

DEFAULT RELATIONSHIP STRENGTH n0n2: 5
n0n4: 7
n0n5: 5
n0v1: 6
n0m0: 2
n1n4: 9
n2n5: 3
n2v1: 5
n3v0: 3
n3m0: 5
n4v1: 7
v0v1: 7
v1m0: 10

FIG. 6

CONCEPT-BASED AUGMENTATION OF QUERIES FOR APPLYING A BUYER-DEFINED FUNCTION

RELATED APPLICATION

The present application is a continuation of U.S. application Ser. No. 15/293,931 filed on Oct. 14, 2016, which is incorporated by reference in its entirety.

FIELD OF THE INVENTION

The present invention is in the field of advertisement bidding in systems that perform natural language processing.

BACKGROUND

Conventional advertising depends on keywords. Advertisers specify bid amounts on keywords for their campaigns. As a result, queries that express a concept relevant to the advertiser, but using long tail words that the bidder did not specify, do not hit the ad. Furthermore, queries that use the bid keywords in an expression of a topic unrelated to the advertiser's market will hit the ad irrelevantly.

Another problem with the conventional approach is that ad buyers may only specify a fixed bid amount per keyword, regardless of the relevance of concepts and particular semantic information related to user expressions. Though ad providers have performed much research and development into ways for ad buyers to maximize relevance to content and optimize the efficiency of money spent, ad buyers are at the mercy of ad providers' keyword and bid amount algorithms.

SUMMARY OF THE INVENTION

Some, but not necessarily all, novel aspects of the invention are present in various embodiments. One aspect is the use of concepts, in contrast to keywords, in ad bid amount calculations. One aspect is that ad buyers provide bids that are functions, rather than specific amounts. One aspect is the use of one or more expression concepts within functions. One aspect is the use of the values of one or more pieces of semantic information referenced by expressions. One aspect is the use of the dynamic values, such as ones accessible through web APIs. One aspect is the varying of ad content based on the values of semantic information referenced by an expression. One aspect is the use of one or more pieces of environmental information in bid functions. One aspect is ability for ad buyers to modify bid functions. One aspect is providing advertisements in the form of questions, such as ones that solicit further requests for information about a product or service. One aspect is providing an audio clue indicating the portion of a spoken response that is an advertisement. One aspect is expanding the set of expression concepts upon finding that none of the concepts in an expression's concept set are referenced by any bid function. One aspect is doing such expansion using a concept graph.

BRIEF DESCRIPTION OF THE DRAWINGS

FIG. 6 illustrates a computer representation of a concept graph according to some embodiments of the invention.

DETAILED DESCRIPTION

Figure 1:
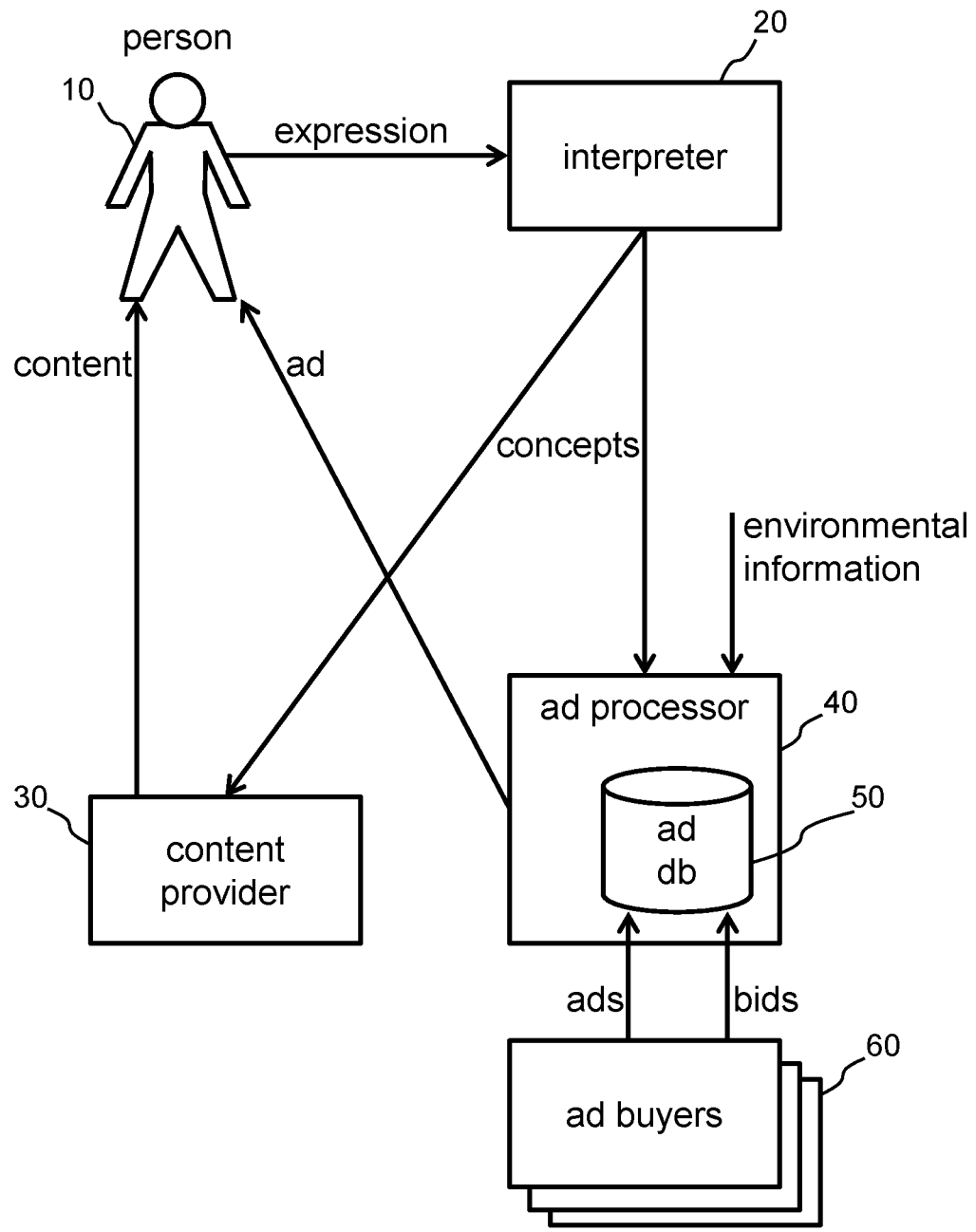
FIG. 1 illustrates the components of a system comprising an embodiment of the invention.

In response to a Texan's request to a natural language enabled virtual assistant for the weather in New York next week, the assistant reports the weather forecast and follows it by asking the Texan if she needs an airplane ticket and hotel. If so, the assistant offers her a ticket on JetWest airlines and a room reservation at the Wyndy Accorn hotel. The assistant only makes that offer because the Texan is more than 250 miles from New York and next week is late enough that it can be reached by airplane but soon enough that flight reservations are available. It would be inappropriate for JetWest and Windy Accorn to use traditional keyword bids for their ads. It would illogically ask New Yorkers if they need flights and hotels for New York. An appropriate natural language concept bid for airlines and hotels would be for expressions regarding "conditions of distant places". Some expression might indicate the concept directly, such as by an explicit mention of Dallas and New York in a single expression. Some expressions might indicate the concept by reference to New York shortly after a prior expression about Dallas. Some expressions might indicate the concept implicitly due to a relationship between the expression and information about a person or the person's environment, such as an expression by a person known to live in Texas or the fact that the articulator issued the expression in Texas.

Concepts

One may consider concepts to be arrangements of connectivity of neurons within a brain and a pattern of their firing the result of which communicable to form corresponding arrangements and patterns within another brain. Words, or multi-word (bigram, trigram, n-grams) combinations represent concepts. Synonyms are words that represent the same concept, such as sofa and couch. Words in different languages are synonyms, such as dog in English and chien in French. Some words and n-grams represent different concepts in different contexts. For example, hot, in the context of weather, represents the concept of a greatness of temperature, whereas hot, in the context of Szechuan cooking represents the concept of a greatness of spiciness. Some words or n-grams express different concepts simply as a result of the emphasis or prosody of how they are spoken. For example, a pretty big girl represents different concepts when emphasis is on the word pretty and when emphasis is on the word big.

One way or representing concepts in a computer system is as indexes into enumerated arrays or hash tables. Essentially, each concept is represented by a unique number or address. In various such implementations of representation of concepts, the arrays or hash tables contain data indicating words and n-grams that represent each concept, and relationships between concepts. The relationships between concepts form a concept graph, where each concept is a node, and the relationship is an edge. In some embodiments, concepts have multiple synonym words or n-grams, and some embodiments provide information about what context in which each word on n-gram represents the concept. In some embodiments, relationships are indicated with a strength value. Essentially every concept has some relation to every other concept with some degree of strength, the degree being insignificantly small between most pairs. In some embodiments, for practical implementations, only relationships with strength above a certain degree of significance are represented. Some such representations are, for each concept, a list of pointers for to other concepts. Some embodiments represent the relationship edges of concept graphs as directional, and some embodiments have non-directional relationships. Some embodiments represent information about concepts other than strength, such as a degree to which concepts are opposites (a high degree for love and hate, but a low degree for mule and donkey), or whether one is a component of another.

There are numerous ways to create concept graphs. One way is to search a large corpus of blog posts or a large corpus of tweets to identify strengths based on the proximity of concepts. Another way is to search dictionaries and use the relationship of words within the definition of other words to identify concept relationships.

Natural language understanding (NLU) is the field of using computers to parse the words of expressions in order to extract concepts and, based on their relationship, interpret the meanings and intents of the articulators of the expressions. NLU involves many processes beyond simple comparison of keywords or mappings of simple mapping of words to enumerated concepts.

Examples of Aspects

According to some embodiments of the invention, a system provides for advertisers to bid on concepts, instead of, or in conjunction with, keywords. For example, an expression asking about the weather next week in Timbuctoo includes the concepts of weather conditions, time in general, next week specifically, a place in general, Timbuctoo as a specific place, and a great distance. Whereas an ad buy on the keyword 'weather' would have relevance to such an expression, few ad buyers are likely to bid on enough place names in the world to include Timbuctoo.

According to one aspect of the invention, ad bids are for concepts. For example, a hotel company may bid on the concept of a great distance. The ad processor interprets expressions to derive a set of concepts. For example, depending on the location of the articulator, the ad processor determines whether the expression includes the concept of a great distance. If so, the ad bid amount is large, otherwise not.

Ad processors implementing some embodiments of the invention let ad buyers specify bid amounts as functions. Bid functions depend on one or more concepts, and may also depend on semantic information and environmental information. Some systems support so many ads that it is inefficient to check every ad bid function for every received expression. Some such systems index ads, and their associated bid functions, by the concepts used in the function. Accordingly, for each concept determined to be in an expression, the system only needs to evaluate directly relevant bid functions.

Ad processors evaluate the function based on the concepts in interpretations of articulator expressions, and any semantic information or environmental information referenced in the functions, then calculate bid amounts accordingly, and choose to provide the consumer with the one or more ads with the highest bids. For example, a provider of calendar application services might bid on the concept of time in general. An airline might define a bid function that is 2 cents for expressions with the concept of next week, 20 cents for expressions with the concept of a great distance, and 1 dollar for expressions that contain both concepts.

Ad processors implementing some embodiments of the invention allow ad buyers to specify bid functions that use values expressed as semantic information in expressions. For example, an airline might create such a bid function in which the bid amount is equal to 20 cents*log(distance to a place)+20 cents*(2 days<length of a time<3 months), where "distance to a place" is a distance between places discernable from the expression and "length of time" is a time period referenced in the expression or the time between a current date and a date referenced in the expression. For purposes of this disclosure semantic information is the information that conveys meaning within an expression. For example, in the sentence, "Marie eats noodles." the semantic information is the fact that Marie is involved, eating is involved, and noodles are involved. The sentence has syntax that indicates who is doing something, what is being done, and what is having something done to it. For purposes of this disclosure, a semantic information value is a computer representation of specific semantic information.

Ad processors implementing some embodiments of the invention allow ad buyers to specify bid functions that depend on semantic information. The ad processor receives such information from an appropriate information source and uses it in evaluating the function. The ad buyer can be the data source, but data may also come from third parties, such as accesses to an external API. For example, an umbrella vendor might define a bid function that is 15 cents for an expression with a weather concept and the result of a weather information lookup being a forecast of rain.

Ad processors implementing some embodiments of the invention allow ad buyers to offer variable ad content, with a bid amount corresponding to the content. For example, a clothing company might bid on expressions having a weather concept where a temperature in a range greater than 30 degrees Celsius yields an advertisement for swimsuits with a high bid amount, a temperature in a range less than 15 degrees Celsius yields an advertisement for jackets with a high bid amount, and a temperature between 15 and 30 degrees Celsius yields an advertisement for t-shirts, but with a low bid amount.

Ad processors implementing some embodiments of the invention allow ad buyers to specify bid functions that use environmental information outside of the expression concepts and semantic information value. Some such environmental information is the time of day, current events, the location and motion of the articulator, information from device sensors, behavioral patterns of the articulator such as daily, weekly, and yearly repeated activities, and the demographic profile of the articulator, such as gender, age, ethnicity, home location, likes and dislikes, and history of prior expressions. For example, a clothing vendor might define a bid function that promotes a coupon ad for swimsuits in response to expressions with travel and water concepts, semantic information values of weather above 30 degrees Celsius, and environmental factors of local time of day being between 3 µm and 10 µm by females between 15 and 35 years of age with a location that is within 15 miles of one of the vendor's retail locations.

Ad processors implementing some embodiments of the invention allow ad buyers to modify their bid functions from time to time. Ad buyers might do so for various reasons, such as to temporarily disable ads, or to measure the effects of different algorithms on the effectiveness of a campaign. With control over the bid amount function, ad buyers have a greater ability to optimize campaigns than simply adjusting keywords and bid amounts and depending on the algorithms of ad processors.

Implementations

FIG. 1 shows a system comprising an embodiment of the invention. An articulator 10 is a person who issues natural language expressions. In various embodiments expressions are spoken, typed, or gestured. Other means of expression are also possible. An interpreter component 20 takes in expressions, interprets them, and outputs sets of concepts. In some embodiments the interpreter is a natural language (NL) processor that takes in expressions and outputs interpretations as complex data structures. Some such representations include arrays of instances of enumerated concepts, their types within the expression context, their grouping, and indications of relationships between concepts and groups. A content provider 30 takes the interpretation, or set of concepts, as input and outputs relevant content. In various embodiments, the content provider is a virtual assistant or other agent enabled to receive queries and lookup answers to questions or produce desired behaviors such as displaying written or graphical information, outputting video or audio, or outputting speech audio in a natural language.

According to the system of FIG. 1, an ad processor 40 provides an ad that is responsive to the expression. The ad processor issues one or more ads in conjunction with the content. The ads may take any form that content may (text, images, video, audio, etc.). The ad processor 40 provides the ad by choosing one or more ads from an ad database 50. The ads in the database 50 are from ad buyers 60. The choice is based on a comparison of the result of evaluation of bid amount functions also provided by ad buyers 60.

Figure 2:
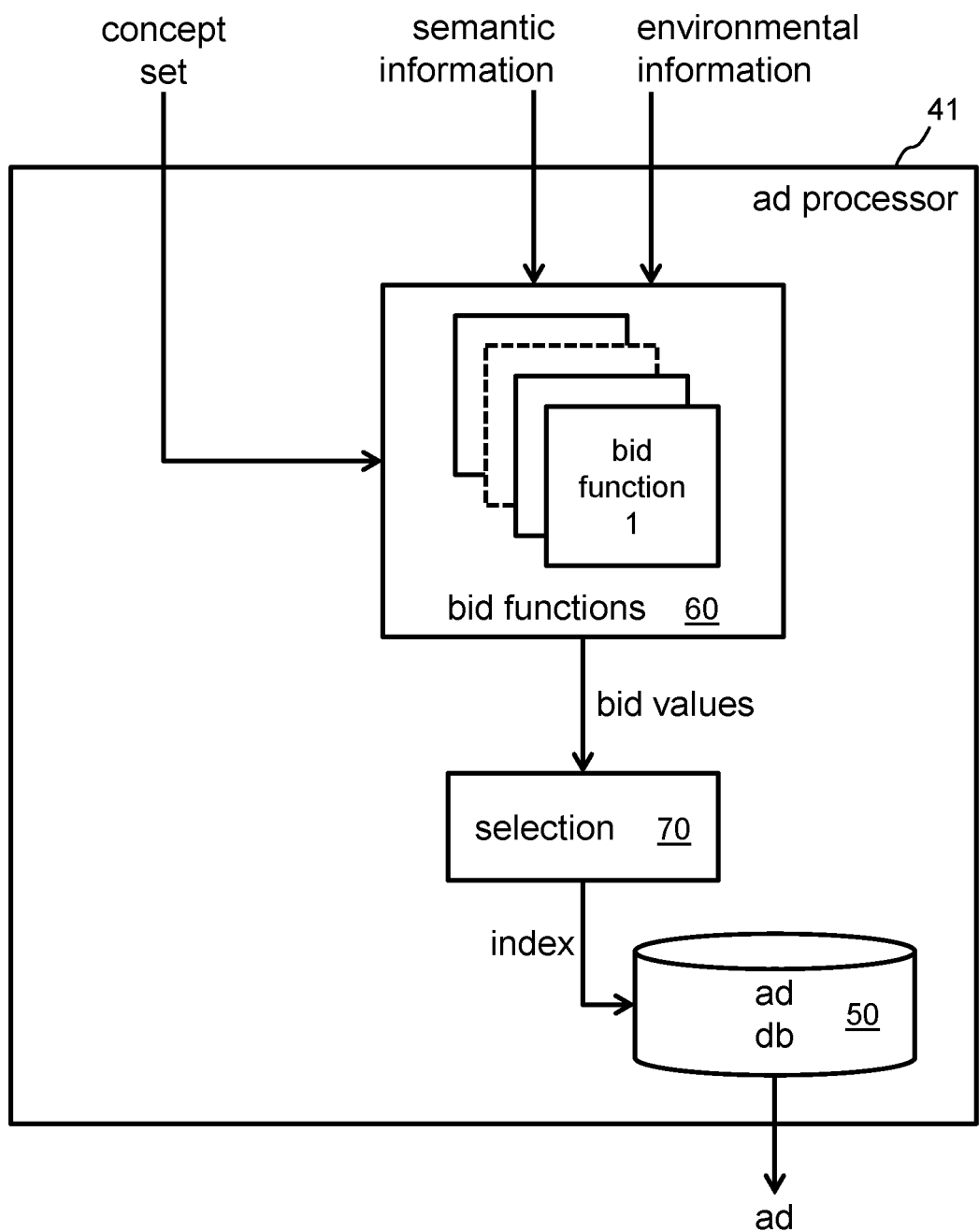
FIG. 2 illustrates the components of an ad processor according to some embodiments of the invention.

FIG. 2 shows the function of an ad processor system 41 according to an embodiment of the invention. The system takes as input data structures representing: expression concept sets; semantic information values; and environmental information. Not shown is an external functions that parses and interprets expression to produce the concept sets. Also not shown are external functions to access data sources to determine the semantic information values, such as news headlines, a text message, or other information requested or referenced by the articulator. Also not shown are external functions that determine environmental information, such as accessing a stored user profile; a location based on a location service using a global satellite-based positioning system; the time of day, and other information not referenced by the articulator.

The ad processor 41 shown in FIG. 2 stores a number of bid functions 60, each defined by an ad buyer. Each function 60 receives, as input, the expression concept set, semantic information values, and environmental information. Each outputs a bid amount according to evaluation of its function. Functions are programmatic functions. Any common programming language, such as C++, Python, or Javascript or any proprietary programming language is useful for implementations of the invention.

Each bid amount corresponds to an ad in an ad database 50. The ad processor compares all bid amounts and uses a selection function 70 to select the ones with the highest bid values. The selection 70 provides an index into the ad database 50 in order to choose the ads to output, from the database to the consumer. In some embodiments ads and corresponding bids are collected in a priority queue. One or more ads with the highest bid(s) are selected, and the selected ads are presented to a consumer.

Many types of data are interesting to articulators. Some information is essentially static, such as restaurants, Wikipedia articles, and driving routes. Some are dynamic, such as weather, stock prices, news, and sports. Many ways are known for dynamic data lookups. For example, some data sources provide access to their data through web application programming interfaces (APIs) that provide data in Javascript object notation (JSON) format from Hadoop storage in response to client universal resource locator (cURL) accesses to a representational state transfer (REST) server.

Some embodiments of the invention are speech-enabled. Some such systems transcribe an articulator's speech to text using an ASR function. In some embodiments, the ASR function is a standalone module, and in some embodiments, it is tightly coupled with natural language processing. In either case, it produces transcriptions from spoken expressions.

Figure 3:
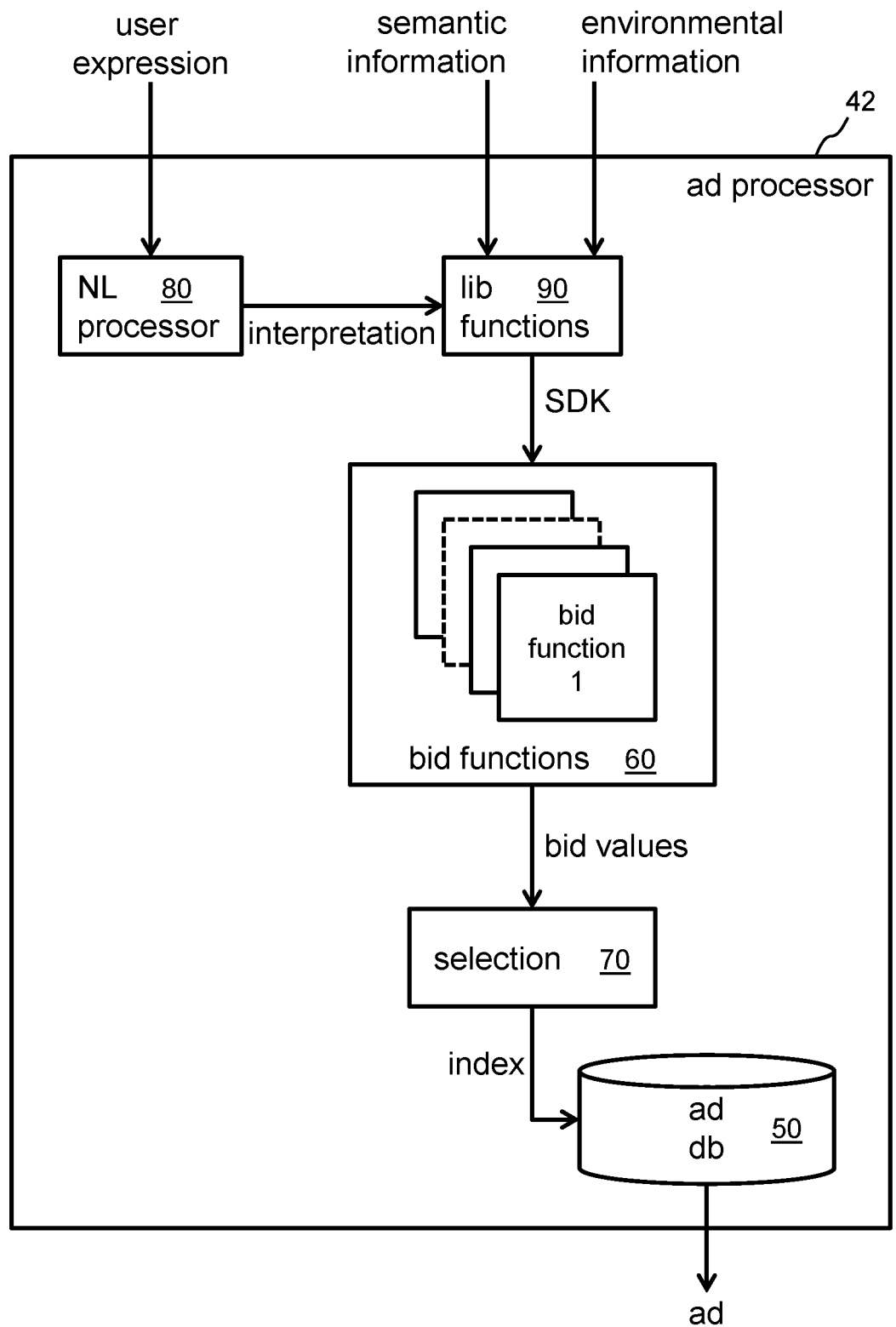
FIG. 3 illustrates the components of an ad processor with natural language processing and library functions according to some embodiments of the invention.

FIG. 3 shows an embodiment of the invention that use natural language (NL) processing to produce interpretation data structures from textual representations of spoken expressions. In this embodiment, the NL processor 80 is part of, and operated by the ad processor 42. In other embodiments with NL processing, the NL processor is a standalone module. NL processors take expressions as input and output interpretation data structures. Some embodiments use neural networks and rely on word embeddings. In some embodiments, an NL processor interprets expressions according to a semantic grammar, parses the expressions, and uses syntax-directed semantics to build the interpretation. Some such embodiments build an interpretation for the expression, and then extract a concept set from the interpretation. Some NL processors also return an interpretation data structure, and process it further on an articulator's behalf, such as by taking dictation or answering questions. Some embodiments, when encountering a response to an expression that asked a question, add concepts from the answer to the interpretation or concept set.

Multiple values of semantic information are required to parse certain expressions completely. For complex expressions, some information look-ups use the value of other information. A value is any information that can be expressed as a number, including numbers that are of enumerated types, indexes into lists or arrays, database record numbers, and pointers to other values. Values can represent any kind of information, including information such as a weather condition, location, or time.

FIG. 3 also illustrates the use of library functions 90. In order to simplify programming, and thereby make ad bidding functions useful to larger numbers of advertisers, some ad processors provide software development kits (SDKs) to ad buyers. The SDKs provide sets of library functions 90 that operate on complex interpretation data structures, specialized semantic information, and diverse environmental information in order to spare ad buyers the need to learn all of the details. For example, one SDK library function provides the distance from the current location. It returns, for each specific place referred to in an expression, the difference between its location and the GPS coordinates of the consumer's location, if known. This difference may be classified as a "great distance" where it exceeds some distance threshold, e.g., 200 miles. Another SDK library function takes in a specific time value and location value, performs a web API access to a weather forecast provider, and returns the expected high temperature. Another SDK library function takes in a consumer-ID, checks the consumer's Facebook profile, and returns the age, gender, marital status, and zip code of the consumer.

Some embodiments compile bid functions to executable computer assembly language code using a compiler. The code is sufficiently compact, that it can run, per expression, for thousands of ads from cache or from fast local memory without requiring access to mass storage. Some embodiments store bid functions in interpreted languages that allow for dynamic addition and removal of ads without the delay of recompiling large groups of ads. Some embodiments store bid functions sequentially based on a simple order, such as when they were placed by ad buyers or alphabetically by name. Some embodiments sort bid functions based on likely execution time so that faster bid functions run first. Some embodiments index bid functions by one or more of the specific concepts, library functions, types of semantic information, and types of environmental information referenced by the bid function. For each expression, the system only evaluates bid functions referencing the expression's specific concepts, library functions, types of semantic information, or types of environmental information.

According to some embodiments of the invention, different actors implement the different components of FIG. 1. The articulator 10, the function of interpreting expressions 20, the ad processor 40, the keeper of the ad database 50, the ad buyer 60, and the content provider 30 might be separate entities, or any particular entity may comprise multiple components.

Ad Delivery

Once an ad is chosen—and dynamically configured if needed—it must be delivered to the consumer. Various natural-language processing systems may comprise embodiments of the invention. Some such systems are natural language search engines, text-based automated agents; speech-based automated agents; spoken conversational virtual assistants; robot assistants, speech-enabled appliances, vehicles such as cars and airplanes, retail kiosks, media entertainment systems, and speech-enabled apps for mobile devices. In some systems that comprise embodiments of the invention accept spoken utterances and provide natural language responses. The natural language responses comprise both relevant content and spoken natural language advertisements. Some systems provide a visual or video advertisement also or instead of a spoken response.

Some embodiments of the invention provide advertisements in the form of a question or statement to the articulator that prompts for a follow-up expression. For example, a yogurt maker might provide an advertisement such as, "Our yogurt is especially nutritious. Would you like to know more about the benefits of its probiotics?" Such an ad processor's system would recognize a follow-up expression such as, "yes" or "tell me more" as a direct request for a second ad segment from the yogurt vendor.

Some embodiments of the invention provide an audio clue that indicates an advertisement. The clue can be a simple beep or a distinctive sound. An audio clue enables articulators to distinguish specific queries responses content from unsolicited advertising content. Doing so improves the usefulness of certain assistant systems.

Applications

The invention is useful for various types of advertising. It is useful for online and mobile advertising of major brand products and services. It is also useful for political advertising. Some embodiments store a personal history of per articulator. Some embodiments store the history as expression text. Some embodiments store history as arrays of keywords and their usage count, then process the keywords into concepts for bid amount functions. Some such embodiments decrease the counts on a regular basis in order to fade out old expressions. Some embodiments represent history as concepts rather than keywords.

Some embodiments allow political ad buyers to tailor their ad buys to the specific interests of individuals with much finer granularity than traditional demographic-based targeting. Not only does such advertising target individuals, it allows ads to target their specific interests. Furthermore, analysis of expressions issued after an ad delivery are useful to determine persuasiveness and predict voting preference. As devices to capture expressions proliferate, such systems of function-based ad buying provide greater reach than traditional methods.

Another application of the invention to ad bidding and delivery is in the field of print and mail advertising such as newspapers, magazines, and coupon *circulars*. According to embodiments of the invention, coupon circular publishers, as ad processors, allow ad buyers to create ad functions. The publisher uses a geographical concept map to identify concepts expressed within neighborhoods and individual residences. The publishers automatically places, sizes, and orders advertisements in the circular, customized on a per-address basis based on the ad buyers' functions.

Figure 4:
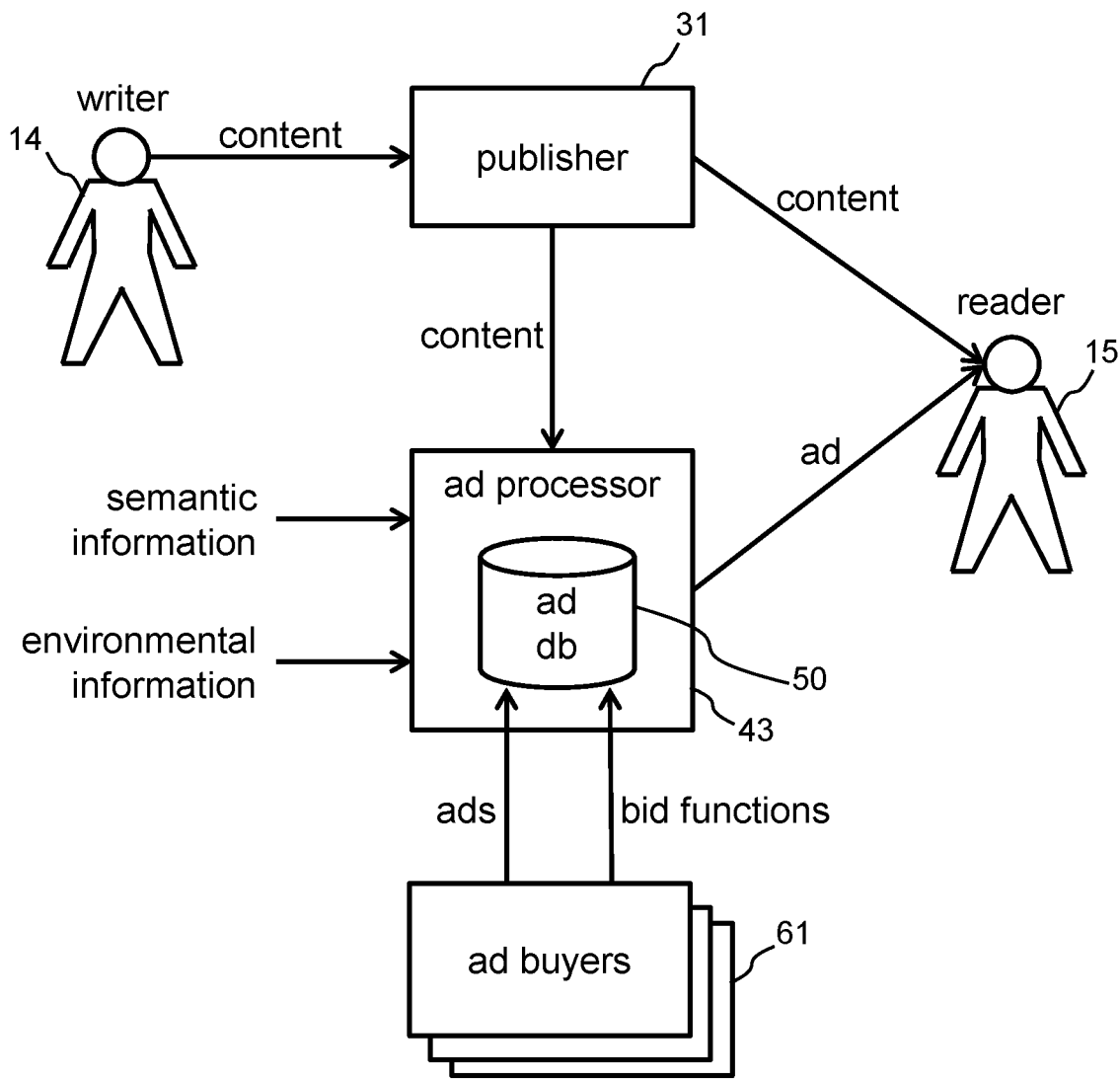
FIG. 4 illustrates the components of a journalistic system according to some embodiments of the invention.

FIG. 4 illustrates another embodiment of the invention, useful for newspaper and magazine print advertising. A publisher 31 receives stories from storywriters 14 and provides the content to readers 15. The publisher 31 also provides the content to ad processor 43. Ad processor 43 uses bid functions from ad buyers 61 to choose ads from ad database 50 and send the ads to readers 15.

As variable-data printing is adopted by mainstream high-volume publications, publishers 31 can become ad processors 43 according to the invention. They can offer ad buyers 61 the option of defining functions based on demographics and other profile information of specific sets of reader subscribers 15. Ad buyers' 61 bid amount functions may also consider published content such as weather forecast, stock prices, but also concepts expressed in stories. In such embodiments, the storywriters 14 are the articulators, but publication readers 15 are the recipients of the ads. This is distinct from some other embodiments in that the articulator of expressions and the consumer of ads are different people.

Concept Graphs

If an ad processor receives the expression, "I'm tied up at the moment", a simple keyword-based ad buy for rope or scissor ads would have a high bid amount. That would annoy the articulator with an irrelevant ad and waste the money of the ad buyer. A concept-based system for determining ad bid amounts, according to some embodiments of the invention, would recognize that the expression does not include the concept of tying, but does have the concept of busyness. An ad bid for time management software or a personal assistant service would have a high bid amount.

If an ad processor receives the acronym-containing expression "Find me ERP solutions?" it might give an inappropriate bid amount to various ads based on ambiguity of the acronym ERP. An ad processor that, according to some embodiments of the invention, provides for bid functions that take personal profile information as input would recognize that, for business executive articulators ERP means enterprise resource planning, but for event organizers ERP means emergency response plan.

If an ad processor receives the expression, "Where was garlic first domesticated?", without a produce vendor making an ad buy, it is likely that all ad bid functions will offer a low bid amount. For lack of a strong bid signal, the ad selection would be based on noise, and tend to be irrelevant. A concept-based ad bidding system using bid functions, according to some embodiments of the invention, gives improved results by weighting function results based on strength of the relationship of concepts in the expression to different concepts in the function. Even if no bid function values the concept of garlic, the concept of garlic has a strong relationship to the concept of vampires. A bid function for an ad buy for an alternative bookstore that sells gothic novels, with a bid on the concept of vampires, would offer a relatively high bid amount, even if its function did not include the concept of garlic. Because the expression includes the concept of garlic, which has a strong relationship to the concept of food, which has a strong relationship to the concept of gardening, and the expression includes the concept of domestication, which has a strong relationship to home, which has a strong relationship to gardens, an ad bid function for a garden supply vendor would offer a relatively high bid amount, even if its ad bid function did not include the concept of garlic.

Some embodiments of the invention that provide for ad bid functions that promote bid amounts based on relationship between concepts and the strengths of those relationship determine those relationships using a concept graph. Some embodiments of the invention represent a concept graph as a 2-dimensional array of strength values between each concept and all other concepts. Many methods are known for representing concept graphs, and any is appropriate for various embodiments of the invention. Some concept graphs are directed and some are directionless. Some include information other than strengths between nodes, such as types of relationships.

Figure 5:
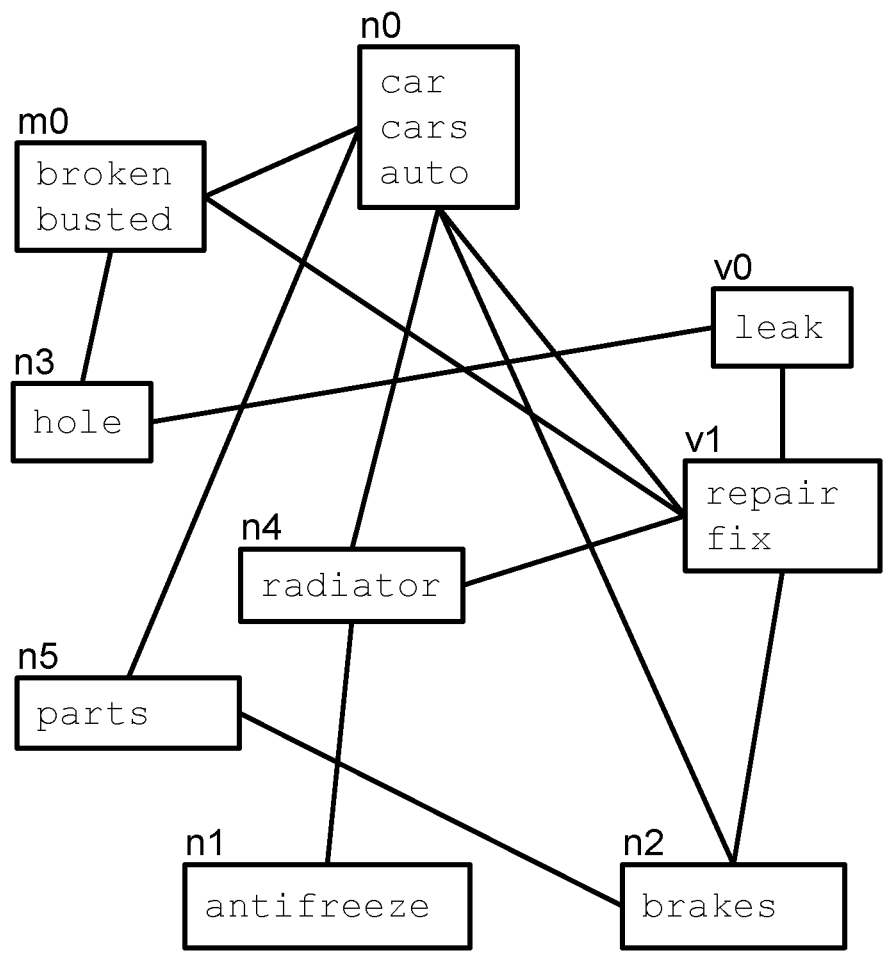
FIG. 5 illustrates a concept graph according to some embodiments of the invention.

FIG. 5 shows a small concept graph in which concepts are nodes with edges showing relationships of significant strength. Concepts are nouns, verbs, and modifiers, named with n, v, and m respectively. Certain concept in the graph can be expressed with multiple words. It is not necessary that all words be synonyms, only that they invoke the same concept in some context. Multiple words are listed for concept nodes in FIG. 5 as appropriate.

FIG. 6 shows a particular representation of a concept graph in a computer file. First is a section list of concepts. Each has a letter and serial number, the letters indicating nouns, verbs, and modifiers respectively, and the serial numbers each being unique among concepts of a type. A colon and a space-separated list of words, in quotes, that express the concept, follow each concept identifier. This embodiment of the invention disregards prepositions, articles, and other words that are not nouns, verbs, modifiers, or phrases of each type.

Second in the file is a list of concept pairs indicated by conjoined concept identifiers. A colon and a number indicating a strength for the connection between the two concepts of the pair follow each pair.

Consider an ad database with an ad for an auto parts vendor claiming the concepts of "car", "parts", and "repair". Those are n0, n5, and v1 of the concept graph.

Consider an expression, "My radiator is busted." It is interpreted as having concepts n4 and m0. It has no keyword match to the ad. Some embodiments of the invention expand the set of concepts to include adjacent connected concepts. Some embodiments start with the least frequently expressed concept, which for this expression is n4 radiator. The set is expanded beyond just n4 and m0 to include n0, n1, n5, and v1. Some embodiments expand starting from the concept of the original expression with the most connections. Some start with the concept with the fewest connections. Some start from the concept with the greatest strength of a concept pair. Various algorithms are appropriate. The expanded expression concept set includes n0 and v1, both of which overlap with the ad concepts, so that ad is selected and presented to the user.

Some embodiments search all, or a set, of the bid functions for a reference to any concepts in the set. Some such embodiments perform expansion iteratively until at least one match is found between bid function concept references and concepts in the expanded expression concept set. If multiple matches are found, concept relationship strengths are used to choose a best ad. In some embodiments, expansion is performed until there are a certain number of matches found, then relationship strengths are calculated to choose the best ad.

Consider the same scenario, but with another ad for an auto towing company claiming the concepts of "car" and "broken". Those are n0 and m0. The user expression, interpreted with concepts n4 and m0 matches the concepts m0 of the towing company ad, so it will be presented to the user before concept set expansion.

Consider a third ad for an auto repair shop claiming the concepts of "car", "broken", and "repair". Those are n0, v1, and m0. The user expression matches concept m0 of both the towing company and the auto repair shop. Some embodiments calculate that the average relationship strength between connections. The average default relationship strength between the expression concepts and concepts of the towing company ad is 4.5. The average default relationship strength between expression concepts and concepts of the repair shop ad is 6.5. The average is also 6.5 for the auto parts vendor. That is largely because of the strength of the connection between the concepts of broken and repair. Since the repair shop offers repair, whereas the towing company does not, the repair shop ad is presented.

Average strength is better than the sum of strengths because the average gives advertisers an incentive to choose relevant concepts, not just large numbers of concepts.

Consider a gender-based demographic overlay that decreases all repair concept relationships by a factor of 2 and all radiator concept relationship by a factor of 10 for female relative to male demographics. That gives an average default relationship strength between the expression concepts and the auto repair shop concepts and parts vendor concepts of only 3.675. Therefore, the towing company ad is presented to women and the repair shop or parts vendor to men.

Consider a second expression, "It has a hole and it's leaking antifreeze.", which is interpreted as containing concepts n1, n3, and v0. Those have average default relationship strengths of approximately 7.5, 7.3, and 7.0 when compared to each of the towing service, repair shop, and parts vendor respectively. Therefore, the towing service ad is presented in response to the second expression.

Consider an overlay for geographic location. If the geographic location is close to the repair shop, that ad will be boosted. Consider an overlay for the user proximity to home. If the user proximity to home is high the auto parts vendor ad will be boosted. Consider an overlay for time of day. If the time of day is outside of business hours, the repair shop will be diminished while a 24-hour towing service will not. Similarly, relationship strengths for antifreeze will be boosted in the winter and diminished in geographic locations with warm weather.

Overlays can be generated based on factors related to the expression grammar. For example, concepts expressed as the subject, predicate, or object of an expression may have their relationship strengths boosted whereas concepts expressed within dependent clauses may have their relationship strengths diminished.

Some embodiments of the invention weight the strength of concept pairs based on the part of speech of each. In some embodiments, the order of relative importance of parts of speech is nouns, verbs, and then modifiers. In some embodiments, the order of relative importance of parts of speech is verbs, nouns, and then modifiers. Some embodiments of the invention weight the strength of concept pairs based on where each concept appears in a grammatically meaningful sentence within the expression. In particular, subject-predicate concept pairs and predicate object concept pairs carry greater weight than pairs involving dependent clauses and modifying phrases.

Many methods of creating, training, and evolving concept graphs are known in fields such as machine learning and artificial intelligence. Most known methods are useful to build concept graphs appropriate for the invention. Many methods involve training a concept graph on an appropriate corpus data. According to some embodiments of the invention, ad processors accept specific concept graphs provided by ad buyers. They have an incentive to create large and meaningful concept graphs in order to improve the relevance (and thereby efficiency of money spent) of their ads. Ad processors aggregate ad buyers' concept graphs into a universal concept graph. As the number of ad buys grows, so an ad processor's universal concept graph improves.

To accommodate evolving language, ad processors according to some embodiments of the invention, gradually decrease the strength of concept connections over time, only increasing them as ad buyers repeatedly provide and reinforce connection strengths. To accommodate short-term fads, ad processors look for concept connections with strengths that vary greatly between new and old concept graphs. The stronger weight is used, but diminished quickly over time until reaching a middle strength or the lower strength.

Some embodiments form an original set of concepts from parsing the input expression. Various embodiments represent concept sets as arrays of strings, arrays of Boolean instances of enumerated types, data structures indicating relationship between instances of concepts, data structures indicating strengths of concepts within expressions, and various other appropriate representations. Some embodiments maintain knowledge, such as in the form of a list, of concepts referenced in each bid function. Some embodiments index bid functions by concepts for fast access. Some embodiments use the concepts in the original set of concepts to access just the indexed bid functions for evaluation for ad bid amounts in response to expressions.

Figure 7:
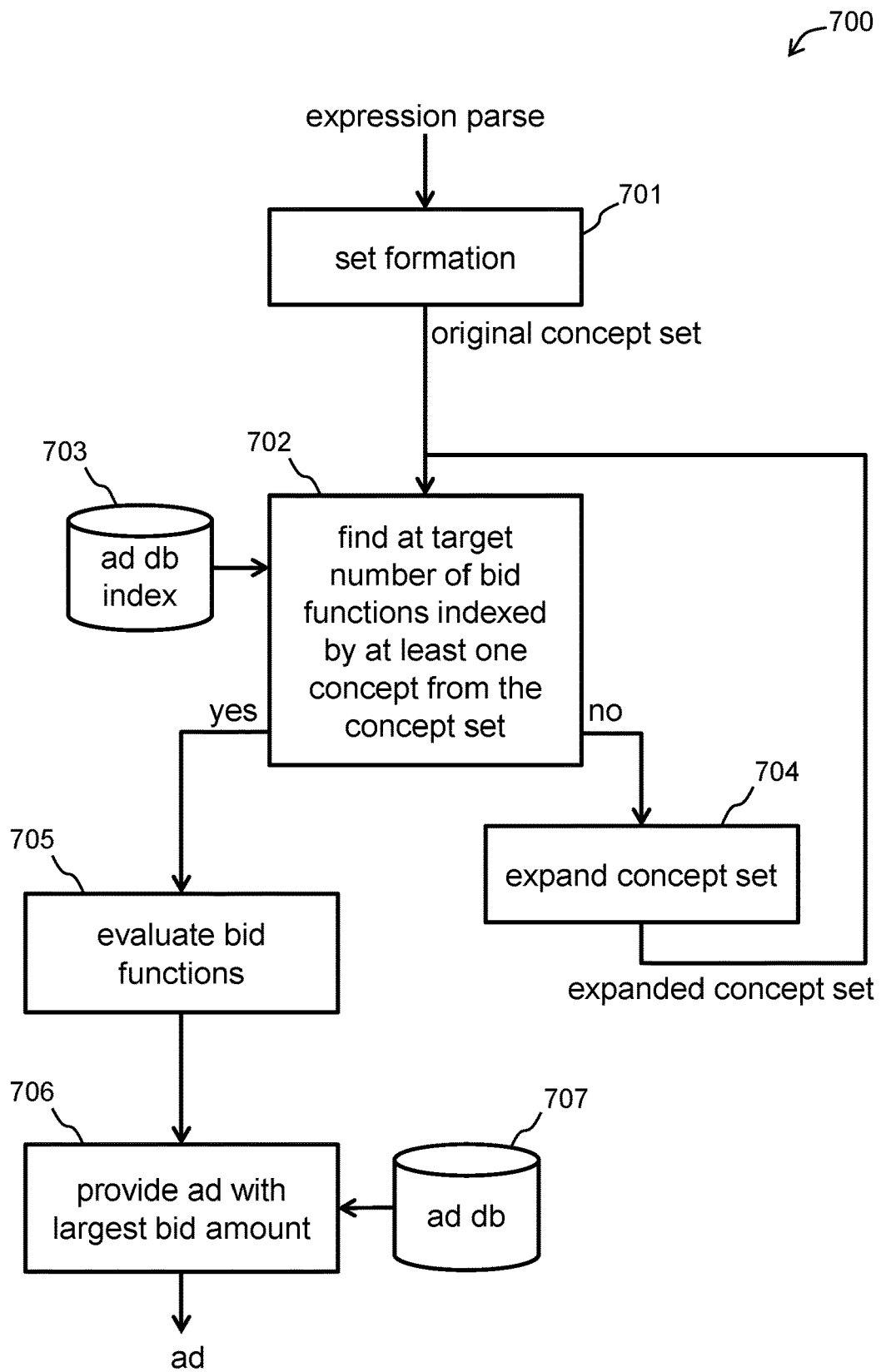
FIG. 7 is a process flow diagram of a method for generating and using an expanded set of concept in accordance with an embodiment of the present invention

Some embodiments, upon finding no bid function with a concept matching any concept in the original set of concepts use a process of, in an iterative manner, intelligently expanding the set of concepts to include others, and searching the ad database, or its index, for bid functions that are based on at least one concept in the set. FIG. 7 shows such a method according to a particular embodiment. Process 700 begins when original set formation step 701 receives an expression parse. It produces an original concept set for further processing. Step 702 receives the original concept set and, for each concept in the set, searches in ad database index 703 to identify any ad bid functions that are based on any of the concepts in the set. Ad database index 703 stores an index of all concepts referenced within the each bid function.

Some embodiments intentionally seek more than one bid function with concepts matching the concept set. This has the benefit of ensuring the evaluation of bid amount calculations that might not directly match the original concept set, but that might yield a larger bid amount than a bid function matching the original or an expanded concept set.

If step 702 finds less than a target number of bid functions matched in the index to concepts within the set, the process proceeds to step 704, in which it expands the set. Many algorithms are known for expanding sets of nodes according to values of the attributes between nodes. Any such algorithm is embodiments of the invention, and particular designs of set expansion algorithms are part of how ad processors differentiate their offerings by targeting particular applications. Some example considerations appropriate for concept set expansion are the order of strengths of potential additional concepts, the distance of potential additional concepts from the original concept set, the cumulative strength of connections through multiple graph routes from set concepts and potential additional concepts, and the cumulative strength of connections from each set concept to each potential additional concept through multiple graph routes. Some algorithms add one concept per iteration to the concept graph. Some add multiple concepts per iteration.

After creating the expanded concept step the process returns to step 702. If step 702 finds at least the target number of bid functions matched in the index to concepts within the set, the process proceeds to step 705, in which the system performing the process evaluates each matched bid function to determine the one with the largest bid value. Next the process proceeds to step 706 in which the system gets, from ad database 707, the ad corresponding to the bid function, the evaluation of which yielded the largest value. Step 706 finishes the process by providing the ad for the consumer.

Figure 8:
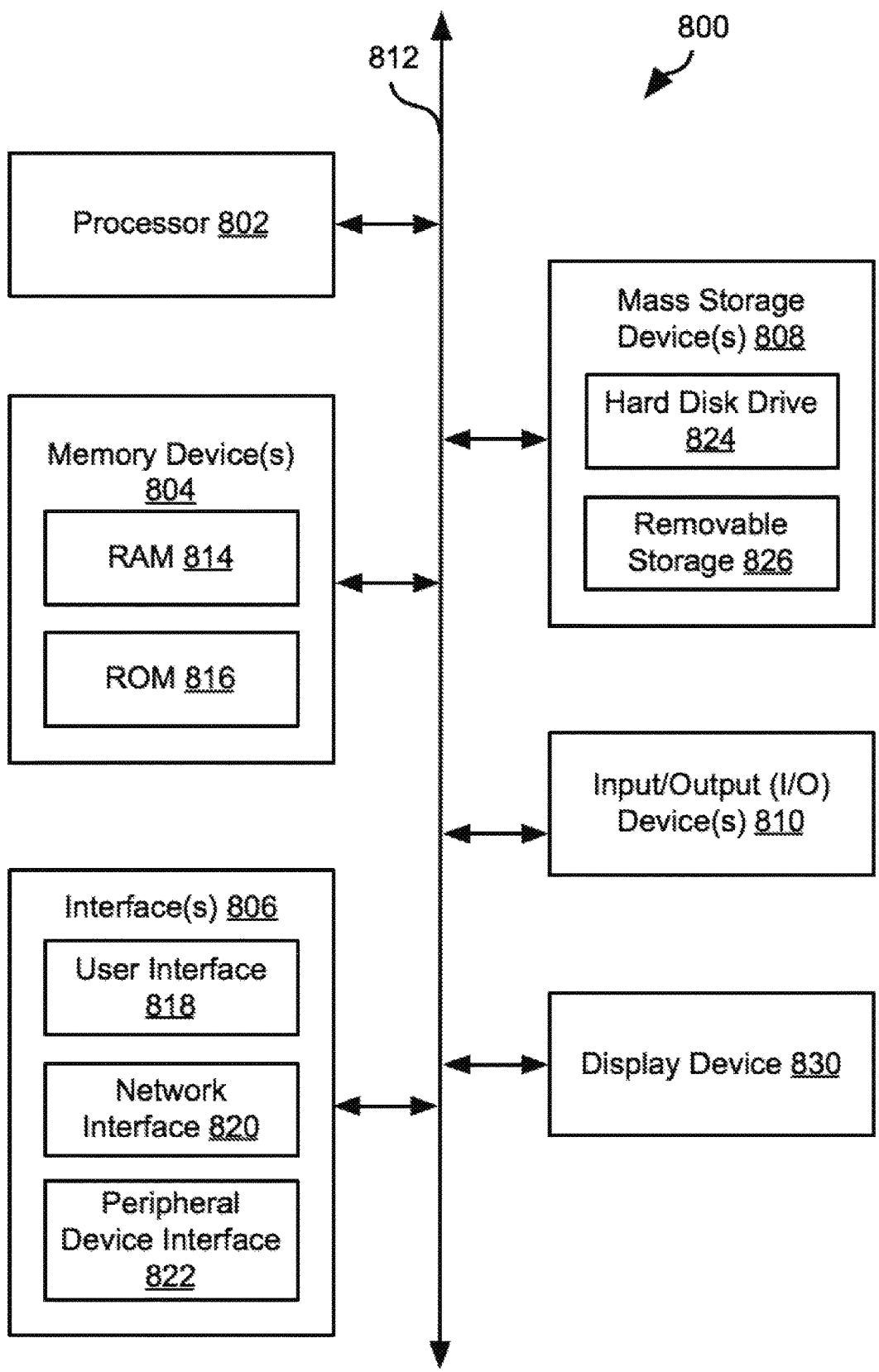
FIG. 8 illustrates an example computing device for implementing the systems and methods disclosed herein.

FIG. 8 is a block diagram depicting an example computing device 800. Computing device 800 may perform, for example, tasks and operations discussed herein with respect to determining network data to display, generating network maps, implementing various algorithms, and the like. Computing device 800 may be used to perform various procedures, such as those discussed herein. Computing device 800 can function as a server, a client or any other computing entity. Computing device 800 can be any of a wide variety of computing devices, such as a desktop computer, a notebook computer, a server computer, a handheld computer, a tablet, a mobile device, a set top box, a portable entertainment device, and the like.

Computing device 800 includes one or more processor(s) 802, one or more memory device(s) 804, one or more interface(s) 806, one or more mass storage device(s) 808, and one or more Input/Output (I/O) device(s) 810, all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media 824, such as magnetic tapes, magnetic disks, optical disks, solid state memory (e.g., Flash memory), and so forth. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Interface(s) 806 include various interfaces that allow computing device 800 to interact with other systems, devices, or computing environments. Example interface(s) 806 include any number of different user interfaces 818, such as touch screens, keyboard, mice, joysticks, and remote controllers, network interfaces 820, such as interfaces to local area networks (LANs), wide area networks (WANs), wireless networks, and the Internet, and peripheral device interfaces 822, such as USB, RS-232, parallel port, and HDMI.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

It is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

The following is not intended to be examined as a claim. It is a needlessly expanded version of a desired claim. This version is a potential replacement, solely if needed to overcome a rejection based on the desired claim's brevity:

A method of providing an advertisement to a user of a natural language processing system, the method comprising:
interpreting a user query using natural language processing;
generating an advertisement in response to the query; and
providing a spoken response to the query, the response comprising the advertisement,
wherein the advertisement is in the form of a question that prompts the user to request a good or service.

What is claimed is:

1. A method of choosing a bid function, the method comprising performing, by a computer system including one or more processing devices:
interpreting an expression to generate an original set of concepts;
searching a set of bid functions for a reference to at least one concept of a set of concepts, the set of concepts including the original set of concepts;
(a) responsive to finding no bid function referencing any concepts of the set of concepts, expanding the set of concepts to include at least one connected concept using a concept graph, the concept graph including a plurality of nodes and a plurality of edges;
(b) after performing (a) searching the set of bid functions for the set of concepts to identify a selected bid function referencing the set of concepts; and
outputting an index referencing an advertisement in a database corresponding to the selected bid function.

2. The method of claim 1, wherein the concept graph is such that each node of the concept graph represents a concept and connections between nodes in the concept graph indicate a relationship between concepts of the concept graph, with weights of connections indicating a strength of the relationship between concepts.

3. The method of claim 2, wherein the concept graph is generated by evaluating a corpus of text and determining the strength of the relationship between concepts according to at least one of proximity of the concepts in occurrences within the corpus and occurrence in definitions of one another in a dictionary.

4. The method of claim 1 further comprising iteratively performing (a) and (b) such that with each expanding of the set of concepts in (a) the expansion is performed from a concept of the set of concepts having a strongest concept connection to the original set of concepts in the concept graph.

5. A method of choosing a bid function, the method comprising performing, by a computer system including one or more processing devices:
interpreting an expression to generate an original set of concepts;
searching a set of bid functions for a reference to at least one concept of a set of concepts, the set of concepts including the original set of concepts;
(a) responsive to finding no bid function referencing any concepts of the set of concepts, expanding the set of concepts to include at least one connected concept using a concept graph;
(b) after performing (a) searching the set of bid functions for the set of concepts; and
(c) responsive to finding one or more bid functions referencing any concepts in the set of concepts in an iteration of (a), applying the one or more bid functions to obtain one or more bid amounts;
outputting one or more indexes corresponding to the one or more bid functions, the one or more indexes referencing one or more advertisements in a database;
wherein the concept graph is such that each node of the concept graph represents a concept and connections between nodes in the concept graph indicate a relationship between concepts of the concept graph, with weights of connections indicating a strength of the relationship between concepts, the concept graph being generated by evaluating a corpus of text and determining the strength of the relationship between concepts according to at least one of proximity of the concepts in occurrences within the corpus and occurrence in definitions of one another in a dictionary.

6. The method of claim 5 further comprising iteratively performing (a) and (b) such that with each expanding of the set of concepts in (a) the expansion is performed from a concept of the set of concepts having a strongest concept connection to the original set of concepts in the concept graph.

7. The method of claim 5 wherein a weight of each concept of the at least one connected concept in the evaluation of each bid function of the set of bid functions is based on a grammatical importance of the each concept within a sentence in the expression.

8. The method of claim 7 wherein a subject, a predicate, and an object of a sentence have higher importance than modifiers and concepts within dependent clauses.

9. A method of selecting one of a plurality of ads, the method comprising:
providing a concept graph including a plurality of nodes and a plurality of connections, each node of the plurality of nodes corresponding to a concept and each connection connecting a pair of nodes of the plurality of nodes and having a weight indicating a strength of a relationship between the pair of nodes, the weight being generated by evaluating a corpus of text and determining the strength of the relationship between the pair of nodes according to at least one of (a) proximity of occurrences of the concepts to which the pair of nodes correspond and (b) occurrence of the concepts to which the pair of nodes correspond in definitions of one another in a dictionary;
performing by a computer system including one or more processing devices:
interpreting a natural language expression to obtain original concepts;
reading, from a data source, a value of semantic information indicated by the expression;
(a) searching a set of bid functions for a reference to at least one concept of a set of concepts, the set of concepts including the original concepts;
(b) when one or more bid functions in the set of bid functions references any concepts of the set of concepts, (i) applying the one or more bid functions to the value of the semantic information to generate one or more bid amounts, (ii) selecting a selected bid function of the one or more bid functions according to the one or more bid amounts; and (iii) outputting an index corresponding to the selected bid function, the index referencing an advertisement in a database;
(c) when no bid function in the set of bid functions references any concepts of the set of concepts, expanding the set of concepts to include at least one additional concept connected to the set of concepts in the concept graph and repeating (a) through (c) with the set of concepts including the at least one additional concept, the concept graph including a plurality of nodes and a plurality of edges.

10. The method of claim 9, further comprising selecting content for the selected bid function based on the value of the semantic information.

11. The method of claim 9, wherein the semantic information comprises a plurality of values.

12. The method of claim 9, wherein the semantic information is about at least one of a weather condition, a geographic location, a person, a time, and a price.

13. The method of claim 9, further comprising weighting the one or more bid amounts of the one or more bid functions based on an environmental overlay such that for each bid function of the one more bid functions, the bid amount of the each bid function is a function of a relationship between concepts referenced by the each bid function to at least one of a current geographic location of a user, current time, gender of the user, and proximity of the user to the user's home.

14. The method of claim 9, further comprising:
providing a natural language response; and
providing ad content corresponding to the selected ad function with the natural language response to a source of the natural language expression.

15. The method of claim 9, further comprising, for at least one bid function of the set of bid functions:
reading information from an ad buyer; and
defining the at least one bid function based on the information from the ad buyer information.

16. The method of claim 9, further comprising, for at least one bid function of the set of bid functions:
reading information from a third-party data source;
defining the at least one bid function based on the information from the third-party data source.

17. A method of choosing a bid function wherein concepts are regions within a multidimensional space, the method comprising performing, by a computer system:
interpreting an expression to compute an expression location within the multidimensional space;
(a) searching regions in the multidimensional space defined by concepts associated with a plurality of bid functions for a region that includes the expression location;
(b) responsive to finding that the expression location is not in any region associated with any bid function of the plurality of bid functions, expanding a set of regions associated with a bid function of the plurality of bid functions by associating with the bid function an additional region of the multidimensional space, the additional region neighboring a region already in the set of regions associated with the bid function;
repeating (a) after performing (b) to identify a selected bid function; and
outputting an index referencing an advertisement in a database corresponding to the selected bid function.

18. The method of claim 17, wherein the additional region is a region of the multidimensional space a highest weighted connection to a concept expressed in the bid function.

19. The method of claim 17, wherein the additional region is one with high grammatical importance.

20. The method of claim 19, wherein nouns and verbs have higher grammatical importance than modifiers.

21. The method of claim 17, wherein the additional region is selected as neighboring the region already in the set of regions that has a high grammatical importance.

22. The method of claim 1, further comprising:
determining an answer to a question included in the expression; and
adding the answer to the set of concepts.

* * * * *